Figure 1:
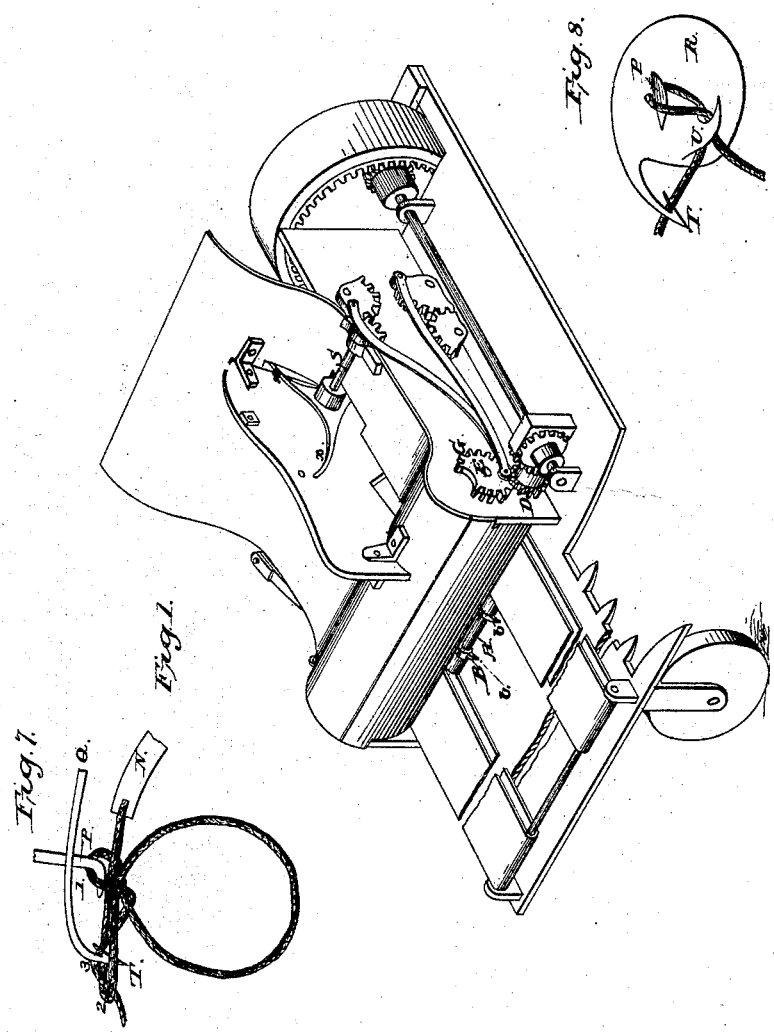

2 Sheets—Sheet 1

O. L. CASTLE.
Grain-Binder.

No. 211,293. Patented Jan. 14, 1879.

Attest
L. M. Castle
Jos. H. Weeks

Inventor:
Orlando Lenn Castle

O. L. CASTLE.
Grain-Binder.
No. 211,293.   Patented Jan. 14, 1879.
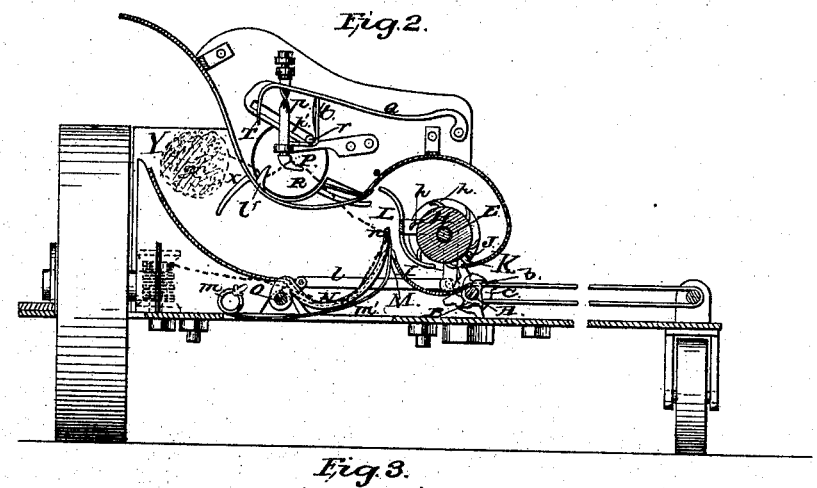
Fig. 2.
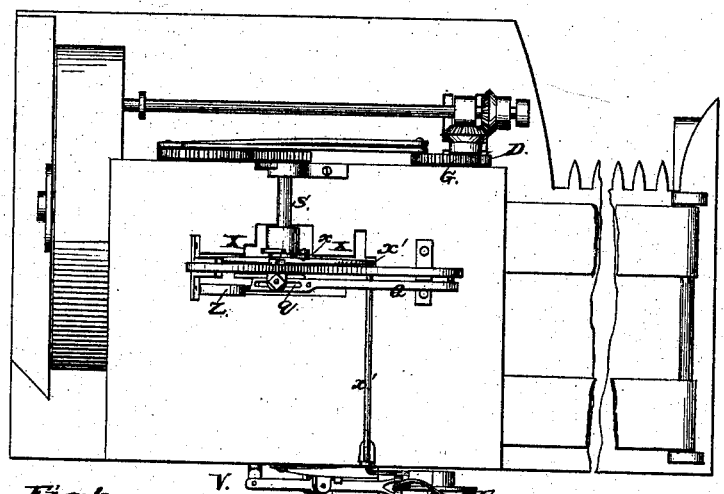
Fig. 3.
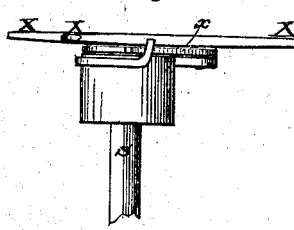
Fig. 4.
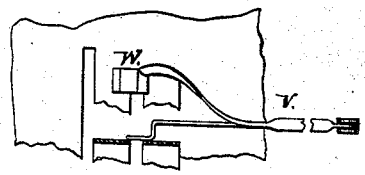
Fig. 5.
Fig. 6.
Attest:
L. M. Castle
Jos. H. Weeks
Inventor:
Orlando Lane Castle

UNITED STATES PATENT OFFICE.

ORLANDO LANE CASTLE, OF UPPER ALTON, ILLINOIS.

IMPROVEMENT IN GRAIN-BINDERS.

Specification forming part of Letters Patent No. 211,293, dated January 14, 1879; application filed November 13, 1877.

*To all whom it may concern:*

Be it known that I, ORLANDO LANE CASTLE, of Upper Alton, in the county of Madison and State of Illinois, have invented a new and useful Improvement in Grain-Binders, which improvement is fully set forth in the following specification, in which—

Figure 1 is a perspective view of an ordinary reaper with my binding apparatus attached. Fig. 2 is a rear elevation, partly in section. Fig. 3 is a top-plan view. Figs. 4, 5, and 6 are detail views. Fig. 7 illustrates the forming of the knot. Fig. 8 represents a modification of part of the knotting apparatus.

The object of my invention is to supplement the ordinary process of reaping by a combined process of conveying, measuring, and binding the grain and delivering it in bundles at the end of the process.

In the drawings, the shaft A, from which all the parts herein described receive motion, is provided with the back-set teeth B B, for the purpose of forcing the grain received from the apron into the mouth of the aperture before which they revolve. It is also furnished with the gap-toothed wheel C, having its sparse teeth in exact line with teeth of the wheel D on the same shaft. E is a shaft, carrying the cam F and the segmented wheel G, capable of connecting with D below it, but running out of gear with it at the end of its own revolution. The drum H, revolving freely, unless purposely checked, upon the shaft E, is provided with the back-set teeth $h\ h$, intersecting the aperture between the drum and a concave surface, I, in order to intercept the free passage of the grain through the said aperture, except as the drum revolves by and equally with the progress of the grain. It also carries the tooth J, which, at the end of every complete revolution of the drum, is brought to bear against the shoulder K, projecting from the shaft E, and at the same time is brought into connection with the gap-toothed wheel C beneath it; and thus the shaft E is itself set in motion.

The shoulder K is arranged on the shaft E, so that the tooth J, when in contact with it, shall be in exact line with a tooth cut away from the wheel G, and consequently the latter will always be brought smoothly into perfect gear with D below it.

J is furthermore made capable of giving way for an instant and again regaining its position by the operation of a spring against its opposite end, in order to prevent violent collision with C.

L is a rake, movable about the shaft E and the drum H, for the purpose of clearing the latter of its coating of grain and throwing it forward upon the needle-arm, and it is operated by the action of the intermediate arms, $l\ l$, connecting its own arms with arms upon the shaft O.

The fender-teeth M, capable of being depressed by the descent of the needle-arm N, and released again by its ascent, in consequence of the operation of the springs $m\ m$ and the lever $m'$, are designed to prevent the grain from occupying the trough in the path of the said needle-arm while the latter is engaged in its proper movements.

The needle-arm N, having near its point an eye, $n$, and on its side a grooved flange for the accommodation of a thread of twine, receives a vibrating motion vertically from its shaft O, for the purpose of carrying forward the grain within its embrace, and at the same time cooperating with other parts in compressing the bundle and tying the knot in the band, one part of which it carries in its eye.

P is a looping-hook, with its upright stem $p$ so twisted that in its passage through the slot $q$ in the arm Q it imparts to the hook an oscillating motion horizontally through any desirable arc, for the purpose of forming in the twine, which has been made to fall across it, a crossed loop.

Q is an arm, slotted at $q$, to receive the stem $p$, as just shown, and also at $p'$, to receive the crank-pin $r$ of the disk R, from which, by the operation of the shaft S, it receives a vibrating motion vertically. It has also a hook, $t$, to aid in keeping the thread above the looper-hook, so that the latter may in its reverse movement pass under the thread; and, finally, the arm Q terminates in the meshing-hook T, to co-operate in fastening the knot by drawing the proper thread of the crossed loop up through the loop formed by the operation of the needle-arm, as is shown in Fig. 7.

The V-shaped guard U is designed to facilitate the last operation by separating the needle and its thread, thus allowing the hook T with its proper thread a free passage between.

The slide V, operated from the cam F, is designed at the proper moment to clamp the threads crossing each other after encircling the bundle; and the knife W, on a prong of the same slide, is for the purpose of cutting the thread between the bundles.

The arms X, revolving freely on the shaft S, carried forward by the pawl $x$, and prevented from backward motion by the pawl $x'$, worked from the cam F, co-operate with the needle-arm in compressing the bundle, and after it is bound carry it forward into the place of the old.

It will be seen from the foregoing description that the grain received from the aprons by the teeth $b$ $b$ is forced into the mouth of the aperture and against the teeth of the drum H, where it is condensed until the pressure is sufficient to overcome the resistance to its forward movement along with the drum; and since the causes of this resistance are practically uniform, the condensation of the grain will be alike uniform, and hence the coating of grain carried forward with the drum in each single revolution will be the same in amount, thus furnishing the means of measuring the bundle to be bound with all reasonable accuracy. Now, each entire revolution of the drum brings the tooth J into contact with the shoulder K and the wheel C, thus setting the shaft E in motion, and bringing the segmented wheel G into perfect gear with D below it. Meanwhile the grain thus conveyed along with the drum in its revolution will have been thrown by the rake L into the embrace of the needle-arm N, which may, for the sake of illustration, be supposed to have remained down during the process thus far described, and the twine to have been stretched between its eye and a bundle previously bound, as at Y. It would thus naturally have been drawn into the angle of the guard U, and at the same time would have been let fall from the hook $t$ across the looper P.

When the wheels G and D have been brought into gear, as just described, simultaneously with the forward and upward motion of the needle-arm N, carrying with it one end of the twine and all the grain corresponding with one revolution of the drum, the fender-teeth M are released and rise with the needle-arm sufficiently to bar the passage of the grain into the trough before them. The rake L is thrown back to make room for the accumulation of the grain. The looper P, by the descent of the arm Q, is made to perform a half-revolution, thereby forming in the twine crossing it a crossed loop, as seen in Fig. 7. At the same time the meshing-hook T is brought down to catch the thread of the crossed loop, which stretches to the previous bundle, as seen in Fig. 2, the point of the needle-arm meanwhile having passed through the crossed loop, and the guard U having separated the needle and its thread, so that the hook T in its descent passes freely between. The slide V will also have clamped the threads that rise from around the bundle, and, by the same movement, will have removed the knife W, so that the thread to be cut between the bundles may rise alongside it. These movements, corresponding with the first half of the revolution of G, will necessarily be reversed during the last half.

The hook T, aided by the friction-rubber Z, draws its thread up between the needle N and its thread, drawing in the slack of the crossed loop from the retreating looper P. The needle-arm N also, in its retreat, forms a loop around the loop made by the meshing-hook T, with which it co-operates in tightening the knot thus formed. The slide V releases the threads within its grasp, and the knife W cuts the thread between the bundles.

The needle-arm in resuming its original place of rest will have depressed the fenders M, and the rake L is again thrown forward, together with the grain that has accumulated during the process of binding, (for it will be observed that the proper operation of the drum H is not affected by the process of binding, only that the latter process is necessary as often as the former is complete;) and, finally, the arms X, released from the pawl $x'$, will, by the action of the pawl $x$, carry the new bundle forward and upward into the place of the old, which it will thus have expelled, and thus all the parts and conditions described will again be in readiness to repeat the foregoing operations.

I desire to add that while I consider the peculiar merits of my method of tying the band to consist in so resolving a bow-line knot into its elements—the crossed loop, inserted loop, and the loop or thread drawn through the latter, fastening it with the former—and so distributing the work of forming these elemental parts that each may be easily effected, yet I do not confine myself to the precise manner of disposing and operating the mechanical devices for effecting the several parts of the work hereinbefore described.

Obviously, the looper P, hook T, and guard U may be attached directly to the disk R, as shown in Fig. 8, and made to reciprocate vertically along with it.

It is also evident that the device by which the segmented wheel G is brought into gear may be made equally effective in producing a clutch-connection.

Having thus described my invention, what I claim as new, and desire to secure by Letters Patent, is—

1. The meter-drum H, in combination with toothed feed-shaft A, concave I, and rake L, substantially as described.

2. The combination of meter-drum H, tooth J, shoulder K, gap-toothed wheel C, segment-wheel G, and pinion D, substantially as described.

3. The combination of the needle-arm N, looper P, hook T, and guard U, substantially as described.

4. The combination of needle-arm N, looper P, hook T, guard U, rubber Z, clamp V, knife W, and arms X, substantially as described.

ORLANDO LANE CASTLE.

Witnesses:
L. M. CASTLE,
JOS. H. WEEKS.